United States Patent
Yoshimura et al.

(10) Patent No.: US 8,970,887 B2
(45) Date of Patent: Mar. 3, 2015

(54) IMAGE FORMING SYSTEM, IMAGE FORMING APPARATUS, AND RECORDING MEDIUM

(71) Applicant: Konica Minolta, Inc., Chiyoda-ku (JP)

(72) Inventors: Tomonari Yoshimura, Kyoto (JP);
Yoshio Komaki, Nishinomiya (JP);
Minako Kobayashi, Ikeda (JP); Hiroki Tajima, Toyokawa (JP); Yoshiaki Shibuta, Amagasaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/897,733

(22) Filed: May 20, 2013

(65) Prior Publication Data
US 2013/0308159 A1    Nov. 21, 2013

(30) Foreign Application Priority Data

May 21, 2012  (JP) .................................. 2012-115440

(51) Int. Cl.
  *G06F 3/12*   (2006.01)
  *G06K 15/00*  (2006.01)
  *H04N 1/00*   (2006.01)

(52) U.S. Cl.
  CPC .......... *H04N 1/00973* (2013.01); *G06F 3/1207* (2013.01); *G06F 3/1204* (2013.01); *H04N 1/00347* (2013.01); *H04N 2201/0075* (2013.01)
  USPC ........................ 358/1.15; 358/1.13; 358/1.16

(58) Field of Classification Search
  None
  See application file for complete search history.

(56) References Cited

U.S. PATENT DOCUMENTS

| | | | | |
|---|---|---|---|---|
| 2006/0092459 | A1* | 5/2006 | Kimura et al. | 358/1.15 |
| 2006/0098224 | A1  | 5/2006 | Tsuboi et al. | |
| 2012/0206768 | A1  | 8/2012 | Tsuboi et al. | |
| 2013/0258400 | A1* | 10/2013 | Kobayashi et al. | 358/1.15 |

FOREIGN PATENT DOCUMENTS

| | | |
|---|---|---|
| JP | 5-122424 A | 5/1993 |
| JP | 2006-135877(A) | 5/2006 |
| JP | 2009-224963 (A) | 10/2009 |

OTHER PUBLICATIONS

Japanese Office Action (Notification of Reasons for Refusal), issued Aug. 19, 2014, in corresponding Japanese Patent Application No. 2012-115440, and English translation thereof.

* cited by examiner

*Primary Examiner* — Satwant Singh
(74) *Attorney, Agent, or Firm* — Buchanan Ingersoll & Rooney PC

(57) ABSTRACT

An image forming system includes an image forming apparatus and an external terminal. The image forming apparatus generates first display data for a first operation screen that includes a key image for receiving an instruction to execute an external terminal program, on the basis of program information regarding the types of external terminal programs that are programs installed in the external terminal, and transmits the first display data to the external terminal. The external terminal displays the first operation screen on a display unit of the external terminal on the basis of the first display data.

13 Claims, 17 Drawing Sheets

| DATA FILE FORMAT | EXTERNAL TERMINAL PROGRAM |
|---|---|
| PDF FORMAT | PDF FILE EDITING PROGRAM (PG21) |
| JPEG FORMAT | OCR PROGRAM (PG22)<br>IMAGE EDITING PROGRAM (PG23) |
| BMP FORMAT | OCR PROGRAM (PG22)<br>IMAGE EDITING PROGRAM (PG23) |
| ⋮ | ⋮ |

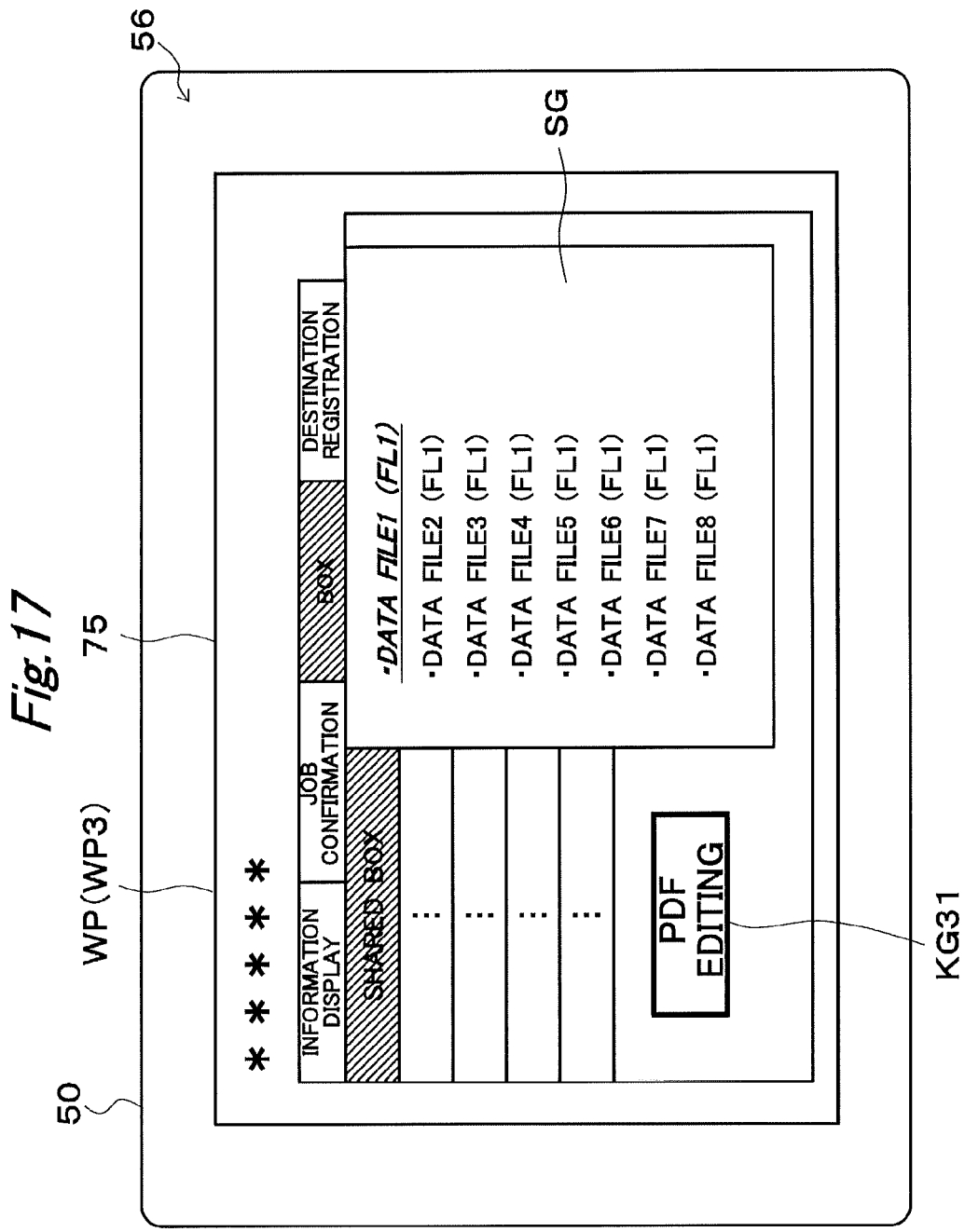

IMAGE FORMING SYSTEM, IMAGE FORMING APPARATUS, AND RECORDING MEDIUM

This application is based on Japanese Patent Application No. 2012-115440 filed on May 21, 2012, the contents of which are hereby incorporated by reference.

BACKGROUND OF THE INVENTION

1. Technical Field

The present invention relates to an image forming system including an image forming apparatus such as a Multi-Functional Peripheral (MFP) and a technique related thereto.

2. Background Art

A technique for operating an image forming apparatus using an external terminal is known.

For instance, Japanese Patent Application Laid-Open No. 05-122424 discloses a technique for directly transmitting operation screen data itself (e.g., bitmapped image data) from an image forming apparatus to an external terminal to display an operation screen on a display unit of the external terminal and transmitting and receiving operation position information (e.g., information regarding a depressed position) displayed in the operation screen to receive operation input through the operation screen. This is a so-called remote control technique using remote connection.

Incidentally, in some cases during the remote control of the image forming apparatus through the above-described operation screen, the user may desire to execute a program installed in the external terminal, rather than a program installed in the image forming apparatus. For example, a case is conceivable in which a program that enables execution of processing on a specific data file stored in the image forming apparatus is not installed in the image forming apparatus but installed in the external terminal. In such a case, it is difficult to execute processing on the specific data file without using the program installed in the external terminal. It is thus preferable that a program installed in the external terminal can also be executed through the above-described operation screen.

The above-described operation screen is, however, merely a remote control screen for using the functions of the image forming apparatus and is not a screen intended for using the functions of the external terminal. For this reason, it was difficult to receive an instruction to execute a program installed in the external terminal through the above-described operation screen.

SUMMARY OF THE INVENTION

It is an object of the present invention to provide a technique that enables a program installed in an external terminal to be executed through an operation screen that is for use in remote control of an image forming apparatus.

A first aspect of the present invention is an image forming system that includes an image forming apparatus and an external terminal communicable with the image forming apparatus. The image forming apparatus includes a generation unit configured to generate first display data for a first operation screen on the basis of program information regarding a type of an external terminal program that is a program installed in the external terminal, the first operation screen including a key image for receiving an instruction to execute the external terminal program, and a transmission unit configured to transmit the first display data to the external terminal. The external terminal includes a communication unit configured to receive the first display data transmitted from the image forming apparatus, and a display control unit configured to display the first operation screen on a display unit of the external terminal on the basis of the first display data.

A second aspect of the present invention is an image forming apparatus that includes a generation unit configured to generate first display data for a first operation screen on the basis of program information regarding a type of an external terminal program that is a program installed in an external terminal communicable with the image forming apparatus, the first operation screen including a key image for receiving an instruction to execute the external terminal program, and a transmission unit configured to transmit the first display data to the external terminal to cause the first operation screen to be displayed on a display unit of the external terminal.

A third aspect of the present invention is a non-transitory computer-readable recording medium having recorded thereon a program for causing a computer built into an image forming apparatus to execute the steps of a) generating first display data for a first operation screen on the basis of program information regarding a type of an external terminal program that is a program installed in an external terminal communicable with the image forming apparatus, the first operation screen including a key image for receiving an instruction to execute the external terminal program, and b) transmitting the first display data to the external terminal to cause the first operation screen to be displayed on a display unit of the external terminal.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates program information.

FIG. 17 illustrates an operation screen of the external terminal.

DETAILED DESCRIPTION OF THE PREFERRED EMBODIMENTS

1. First Embodiment

1-1. Overall Configuration

Figure 1:
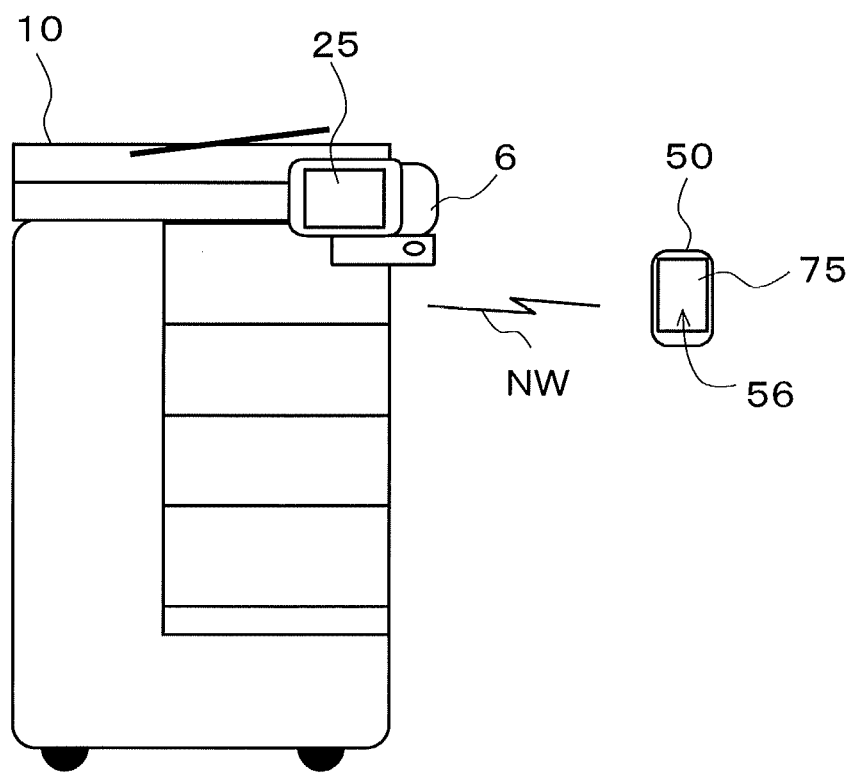
FIG. 1 illustrates an image forming system.

FIG. 1 illustrates an image forming system 1. As illustrated in FIG. 1, the image forming system 1 includes an image forming apparatus 10 and an external terminal apparatus 50.

The image forming apparatus 10 and the external terminal apparatus (simply, "external terminal") 50 are communicably connected to each other via a network NW. The network NW is, for example, a local area network (LAN) or the Internet. The image forming apparatus 10 and the external terminal 50 are, for example, wirelessly connected to each other via the network NW (including a wireless LAN).

The external terminal 50 is an apparatus capable of operating (remotely controlling) the image forming apparatus 10. With the image forming system 1, a user can use the external terminal 50 to perform various types of operations on the image forming apparatus 10. The external terminal 50 is also referred to as an operating device (or a remote controller).

1-2. Configuration of Image Forming Apparatus 10

Figure 2:
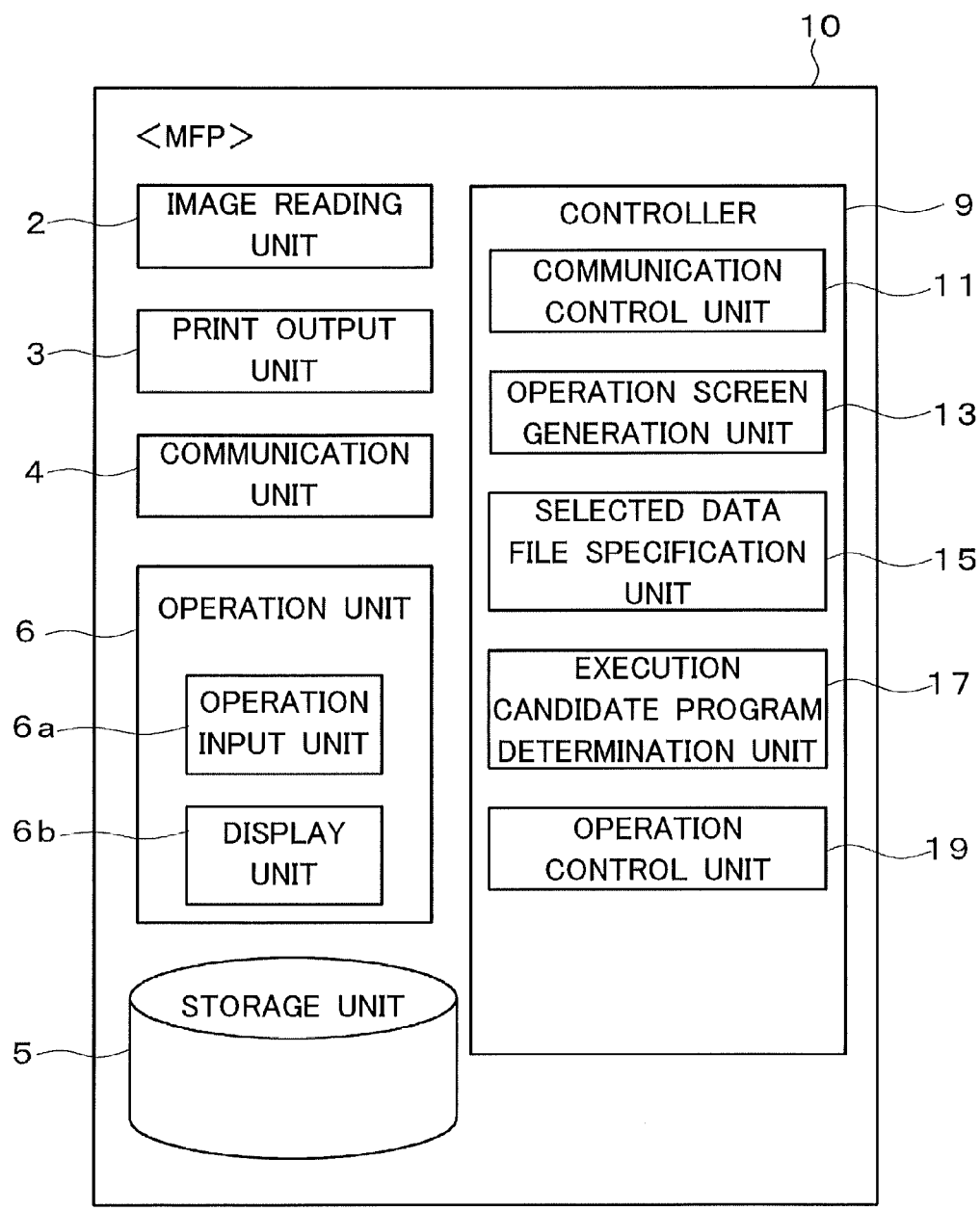
FIG. 2 is a functional block diagram of an image forming apparatus.

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an operation unit 6, and a controller 9 as illustrated in the functional block diagram of FIG. 2 and realizes various types of functions by operating these units in combination.

The image reading unit 2 is a processing unit configured to optically read (i.e., scan) an original document that is placed at a predetermined position on the MFP 10 and generate image data for this document (also referred to as an "original image" or a "scanned image"). The image reading unit 2 is also referred to as a "scanning unit".

The print output unit 3 is an output unit configured to print out an image on various types of media such as paper on the basis of data regarding an object to be printed.

The communication unit 4 is a processing unit capable of facsimile communication via a public network or the like. The communication unit 4 is also capable of network communication via the network NW. In the network communication, various types of protocols such as TCP/IP (Transmission Control Protocol/Internet Protocol) are used. Using the network communication enables the MFP 10 to exchange various types of data with a desired destination (e.g., external terminal 50).

This communication unit 4 includes a transmission unit and a reception unit.

For example, the communication unit 4 (specifically, the transmission unit) transmits display data (specifically, image data) GD for an operation screen GS (see FIG. 8) to be displayed in the external terminal 50 to the external terminal 50 and causes the operation screen GS to be displayed on a touch panel 75 (see FIG. 1) of the external terminal 50.

The communication unit 4 (specifically, the reception unit) receives information (hereinafter, "operation input information") EM regarding operation input to each operation screen GS from the external terminal 50.

The communication unit 4 (specifically, the reception unit) further receives program information PJ1 described below (see FIG. 4) from the external terminal 50.

FIG. 4 illustrates the program information PJ1. The program information PJ is information regarding the types of later-described programs (hereinafter, "external terminal programs") that are installed in the external terminal 50. Specifically, the program information PJ is information that defines the relationship between the external terminal programs and data files (specifically, data file formats of the data files) that can be processed by the external terminal programs. More specifically, the program information PJ1 stores each data file format and the type(s) of one or a plurality of external terminal programs that can handle the data file format in association with each other.

As illustrated in FIG. 4, on line 1 of the program information PJ1, the "Portable Document Format (PDF) format" and an external terminal program (PDF editing program) PG21 that can handle the "PDF format" are recorded in association with each other. On line 2 of the program information PJ, the "Joint Photographic Experts Group (JPEG) format" and external terminal programs PG22 (OCR program) and PG23 (image editing program) that can handle the "JPEG format" are recorded in association with each other. On line 3 of the program information PJ, the "Bitmap (BMP) format" and the external terminal programs PG22 (OCR program) and PG23 (image editing program) that can handle the "BMP format" are recorded in association with each other. Note that, as will be described later, the external terminal programs PG21, PG22, and PG23 are a plurality of programs that are installed in the external terminal 50.

The storage unit 5 is constituted by a storage device such as a hard disk drive (HDD). The storage unit 5 is provided with a shared box (also, "shared folder") BX used by all users. Here, data files FL1 to FL8 that are in various types of data file formats are stored in the shared box BX. The data files FL1 to FL4 are in the PDF format. The data files FL5 and FL6 are in the JPEG format, and the data files FL7 and FL8 are in the BMP format.

The operation unit 6 includes an operation input unit 6a configured to receive input to the MFP 10, and a display unit 6b configured to display and output various types of information. The MFP 10 is also provided with a touch panel (also "touch screen") 25 (see FIG. 1) configured by embedding a piezoelectric sensor or the like in a liquid crystal display panel. The touch panel 25 functions as part of the operation input unit 6a and also functions as part of the display unit 6b.

The controller 9 is a control device that is built into the MFP 10 and performs overall control of the MFP 10. The controller 9 is configured as a computer system including, for example, a CPU and various types of semiconductor memories (RAM and ROM). The controller 9 realizes various types of processing units by the CPU executing a predetermined program (software program) PG1 stored in the ROM (e.g., EEPROM). Note that the program PG1 may be installed into the MFP 10 via a portable recording medium such as a USB memory (in other words, various types of non-transitory computer-readable recording media) or via the network NW or the like.

Specifically, as illustrated in FIG. 2, the controller 9 realizes various types of processing units including a communication control unit 11, an operation screen generation unit 13, a selected data file specification unit 15, an execution candidate program determination unit 17, and an operation control unit 19 by execution of the program PG1.

The communication control unit 11 is a processing unit configured to control an operation of communication with another device (e.g., the external terminal 50).

The selected data file specification unit 15 is a processing unit configured to specify a data file (hereinafter, "selected data file") HF selected through the operation screen GS on the basis of operation input information EM1 regarding operation input to the operation screen GS.

The execution candidate program determination unit 17 is a processing unit configured to determine an external terminal program that can handle the selected data file HF (can execute processing on the selected data file HF) as an execution candidate program on the basis of the program information PJ1.

The operation screen generation unit 13 is a processing unit configured to generate image data GD for a remote control screen (simply "operation screen") GS to be displayed in the external terminal 50. Specifically, the operation screen generation unit 13 determines an execution candidate program that can execute processing on the selected data file HF, in cooperation with the execution candidate program determination unit 17 and generates the image data GD for the operation screen GS that includes a key image for receiving an instruction to execute the execution candidate program.

The operation control unit 19 is configured to control various types of operations such as a print output operation performed by the image forming apparatus 10. The operation control unit 19 controls various types of operations on the basis of operation input using the operation unit 6 of the image forming apparatus 10 itself and operation input using an operation unit 56 of the external terminal 50.

1-3. Configuration of External Terminal 50

Next, a configuration of the external terminal 50 will be described. Here, a mobile terminal, to be more specific, a tablet terminal is illustrated as an example of the external terminal 50. The present invention is, however, not limited to this, and the external terminal 50 may, for example, be a smartphone or a personal computer. Also, the external terminal 50 may be either a portable or a stationary apparatus.

Figure 3:
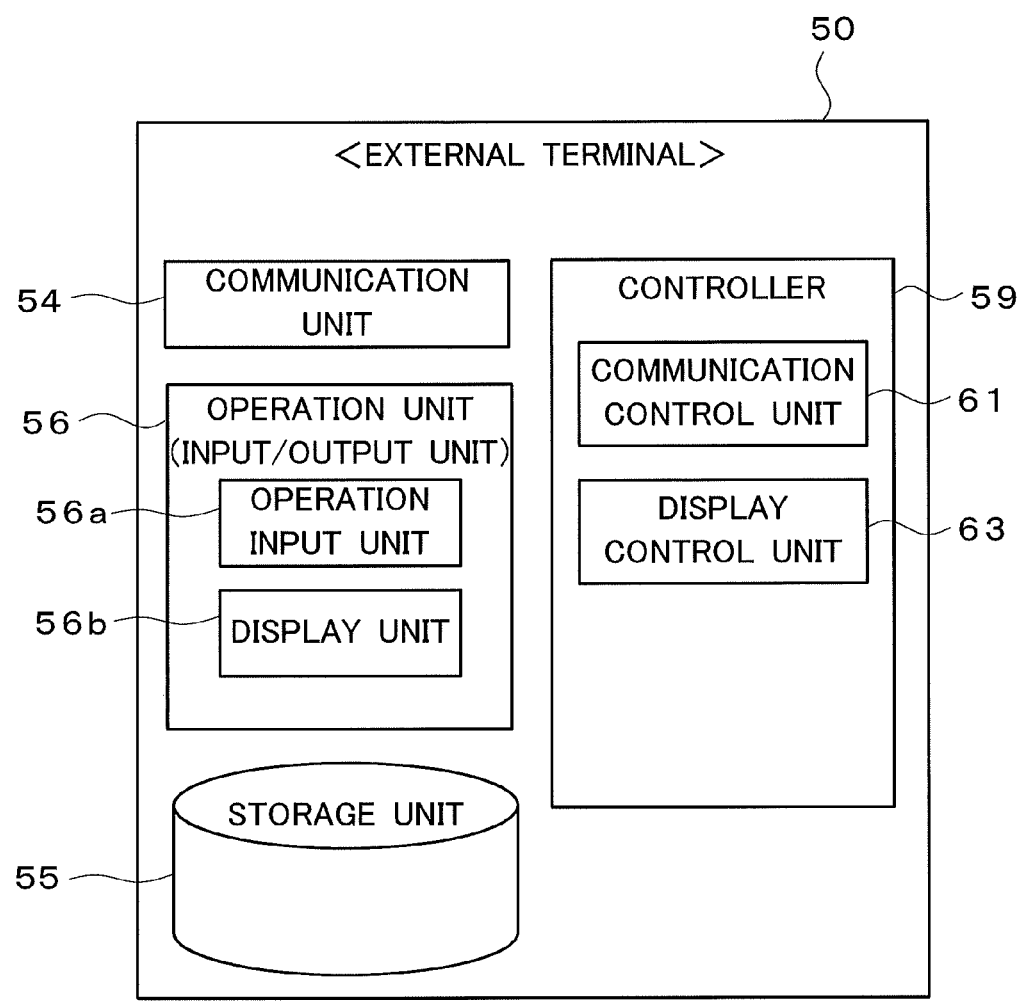
FIG. 3 is a functional block diagram of an external terminal.

FIG. 3 is a functional block diagram illustrating a schematic configuration of the external terminal 50.

As illustrated in the functional block diagram of FIG. 3, the external terminal 50 includes, for example, a communication unit 54, a storage unit 55, the operation unit 56, and a controller 59 and realizes various types of functions by operating these units in combination.

The communication unit 54 is capable of network communication via the network NW. In the network communication, various types of protocols such as TCP/IP (Transmission Control Protocol/Internet Protocol) are used. Using the network communication enables the external terminal 50 to exchange various types of data with a desired destination (e.g., the image forming apparatus 10).

The communication unit 54 includes a transmission unit and a reception unit and exchanges operation information regarding the image forming apparatus 10 or the like with the image forming apparatus 10.

For example, the communication unit 54 (specifically, the reception unit) receives the image data GD for the operation screen GS transmitted from the image forming apparatus 10.

The communication unit 54 (specifically, the transmission unit) also transmits the operation input information EM regarding operation input to the operation screen GS to the image forming apparatus 10.

The communication unit 54 (specifically, the transmission unit) further transmits the program information PJ1 to the image forming apparatus 10.

The storage unit 55 is configured by a storage device such as a nonvolatile semiconductor memory.

The operation unit 56 includes an operation input unit 56*a* configured to receive input to the external terminal 50, and a display unit 56*b* configured to display and output various types of information. The external terminal 50 is also provided with the touch panel (touch screen) 75 (see FIG. 1) configured by embedding a piezoelectric sensor or the like in a liquid crystal display panel. The touch panel 75 functions as part of the operation input unit 56*a* and also functions as part of the display unit 56*b*.

As will be described later, the display unit 56*b* (touch panel 75) displays an image (see FIGS. 8 to 10, for example) that represents a screen similar to the operation unit 6 of the image forming apparatus 10 (screen that resembles the operation unit 6).

The controller 59 is a control device that is built into the external terminal 50 and performs overall control of the external terminal 50. The controller 59 is configured as a computer system that includes, for example, a CPU and various types of semiconductor memories (RAM and ROM). The controller 59 realizes various types of processing units by the CPU executing a predetermined software program (simply "program") PG2 stored in the storage unit (e.g., semiconductor memory). The program PG2 may be installed into the external terminal 50 via a portable recording medium such as a USB memory or via the network NW or the like.

The program PG2 is application software for remotely controlling (remotely operating) the image forming apparatus 10 and realizes various functions related to remote control of the image forming apparatus 10.

In addition to the program PG2, a plurality of other programs (e.g., application programs) can also be installed in the external terminal 50. It is assumed here that the programs PG21, PG22, PG23, and so on that can be operated independently of the program PG2 are installed in the external terminal 50.

Specifically, the program PG21 is a PDF editing program that can edit a data file in the PDF format. The program PG22 is an OCR program that can extract character information from a data file (image data file) in, for example, the JPEG or BMP format through optical character recognition processing (OCR processing). The program PG23 is an image data editing program that can edit a data file (image data file) in, for example, the JPEG or BMP format.

As illustrated in FIG. 3, the controller 59 realizes various types of processing units including a communication control unit 61 and a display control unit 63 by execution of the program PG2.

The communication control unit 61 is a processing unit configured to control an operation of communication with, for example, the image forming apparatus 10 in cooperation with the communication unit 54 or the like.

The display control unit 63 is a processing unit configured to control a display operation performed by the display unit 56*b* (e.g., the touch panel 75). Specifically, the display control unit 63 displays an operation screen GS on the touch panel 75 on the basis of image data GD for the operation screen GS transmitted from the image forming apparatus 10.

1-4. Configuration of Operation Unit of Image Forming Apparatus 10

Figure 7:
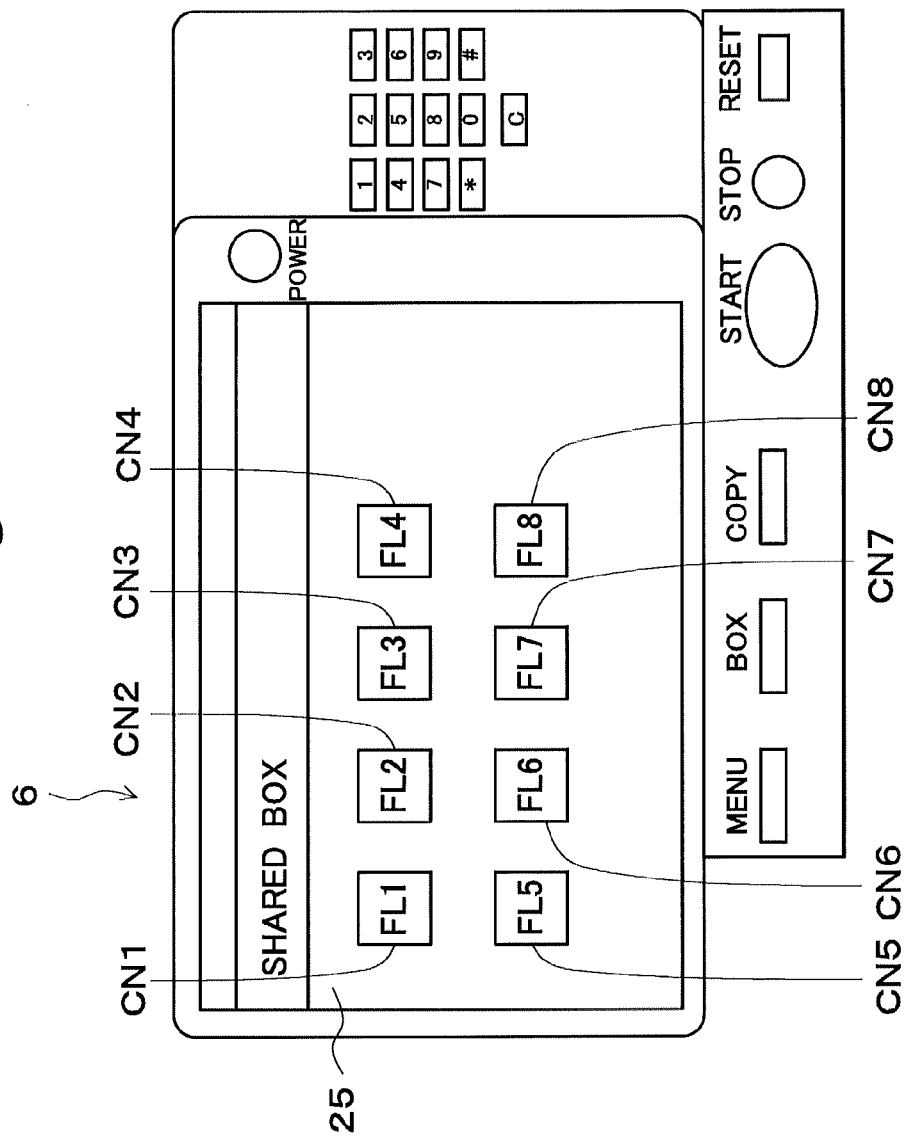
FIG. 7 is a front view of an operation unit of the image forming apparatus.

FIG. 7 is a front view illustrating a detailed configuration of the operation unit 6 (see FIG. 1) of the image forming apparatus 10. As illustrated in FIG. 7, the operation unit 6 includes the rectangular touch panel 25 on the front side.

The touch panel 25 displays various types of menu images (including key images). An operator can make various types of operation input to the image forming apparatus 10 by pressing a key that is virtually arranged in the touch panel 25 (software key (or software button) represented by a key image (also, bottom image)) to set various operation details of the image forming apparatus 10.

Disposed around the touch panel 25 (here, on the right side and on part of the bottom side) are hardware keys (also, "hardware buttons") such as a power key, a numeric keypad, a menu key, a box key, a copy key, a start key, a stop key, and a reset key. The operator can, for example, make various types of operation input to the image forming apparatus 10 by also pressing these hardware keys.

1-5. Configuration of Operation Unit of External Terminal 50

Figure 8:
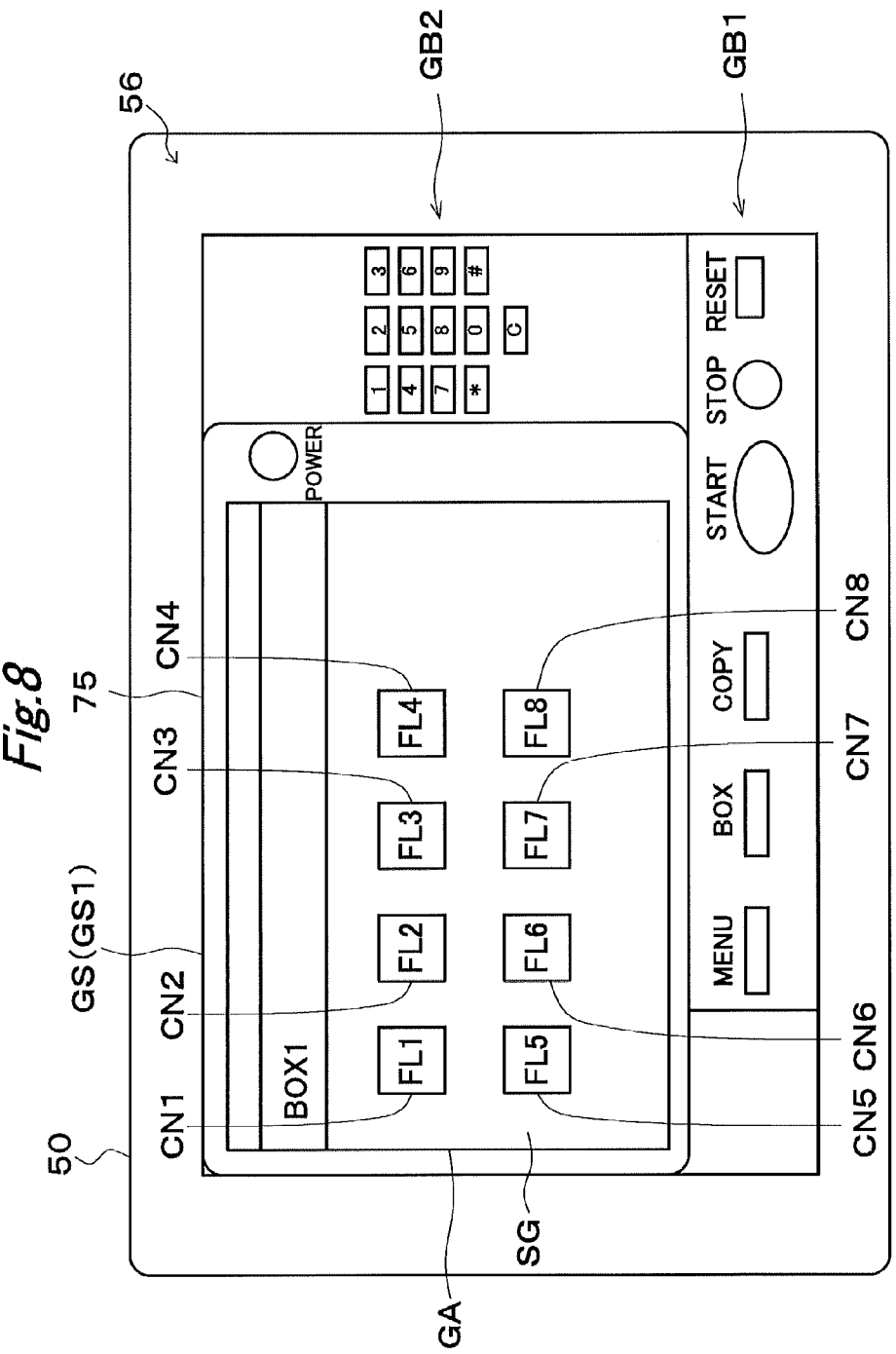
FIG. 8 illustrates an operation screen of the external terminal.

FIG. 8 is a front view illustrating a detailed configuration of the external terminal 50 (specifically, the operation unit 56). As illustrated in FIG. 8, the external terminal 50 is provided with the operation unit 56 on the front side. Specifically, the rectangular touch panel 75 is provided across almost the entire surface excluding the periphery (frame portion) on the front side of the generally plate-like external terminal 50.

As illustrated in FIG. 8, the operation screen GS (GS1) representing the operation unit 6 (see FIG. 7) of the image forming apparatus 10 is displayed on the touch panel 75 in the operation unit 56 of the external terminal 50 when the external terminal 50 is communicably connected to the image forming apparatus 10.

The operation screen GS includes a touch panel image GA and a hardware image GB (GB1, GB2).

As with the image in the touch panel 25, the touch panel image GA includes software keys. Upon receiving operation input using any of the software keys, the external terminal 50 transmits operation input information EM (specifically, information regarding a depressed position or the like) to the image forming apparatus 10. Upon receiving the operation input information EM, the image forming apparatus 10 executes processing corresponding to the operation input made using the software key.

The hardware image GB displays a hardware key image or the like that resembles the hardware keys of the operation unit 6 of the image forming apparatus 10. Upon receiving a depressed operation performed on the hardware key image in the hardware image GB, the external terminal 50 transmits operation input information EM (specifically, information regarding a depressed position or the like) to the image forming apparatus 10. Upon receiving the operation input information EM, the image forming apparatus 10 executes processing corresponding to the operation input using the hardware key image.

1-6. Operation

Figure 5:
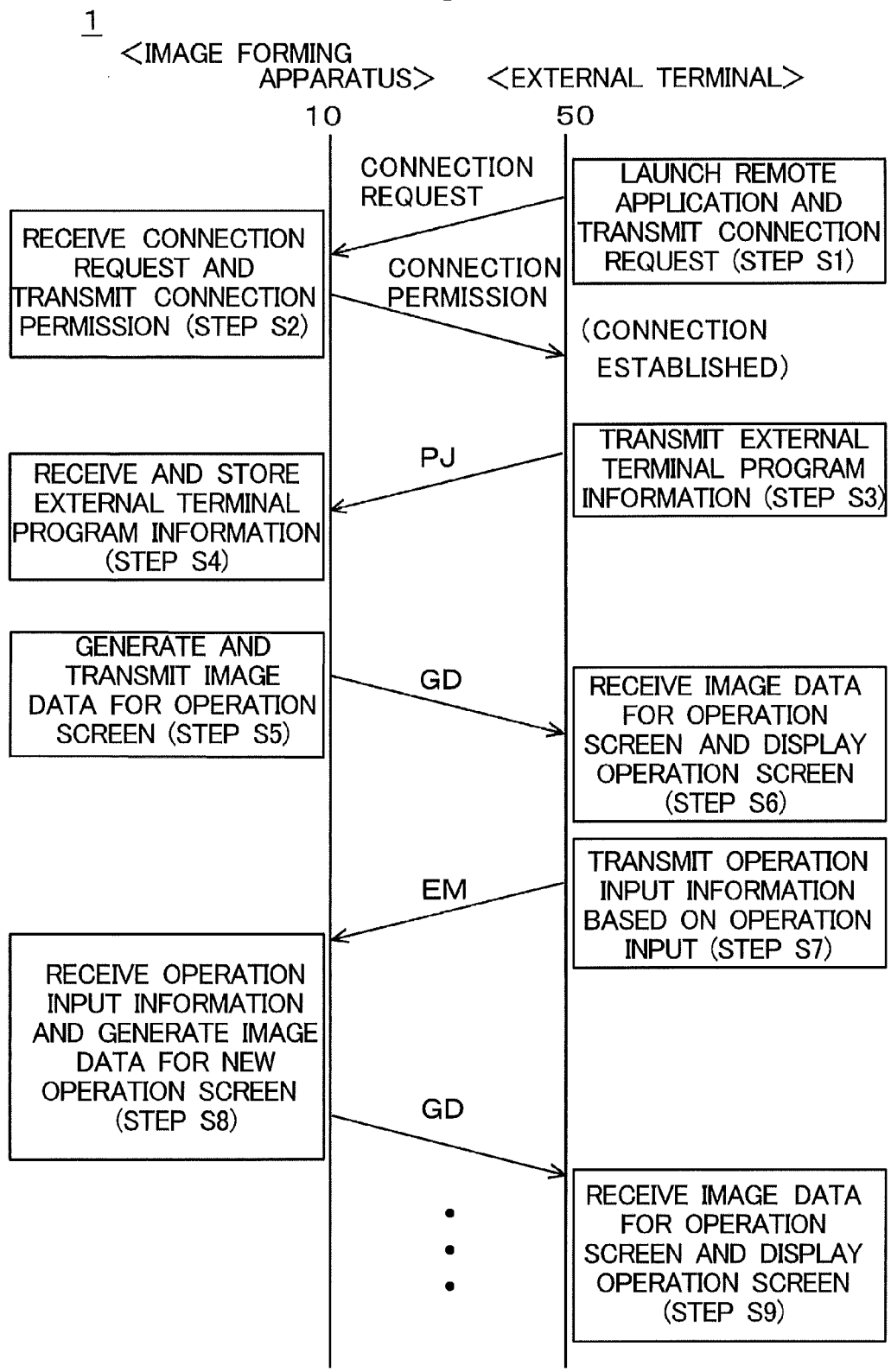
FIG. 5 is a flowchart of operations performed in the image forming system.

FIG. 5 illustrates operations performed in the image forming system 1. The operations performed in the image forming system 1 will now be described with reference to FIG. 5.

First, when the program PG2 is launched by the external terminal 50 (step S1), a connection request is transmitted from the external terminal 50 to the image forming apparatus 10. In response to the connection request, the image forming apparatus 10 transmits connection permission to the external terminal 50 (step S2). This establishes a communication connection between the image forming apparatus 10 and the external terminal 50.

When this communication connection is established, the aforementioned program information PJ1 (see FIG. 4) is transmitted from the external terminal 50 to the image forming apparatus 10 (step S3). The image forming apparatus 10 receives the program information PJ1 and stores this program information PJ1 into the storage unit 55 (step S4).

Thereafter, the image forming apparatus 10 generates image data GD for the first operation screen GS to be displayed on the touch panel 75 of the external terminal 50 and transmits the image data GD to the external terminal 50 (step S5). The external terminal 50 generates the first operation screen GS (not shown) and display that screen on the touch panel 75 on the basis of the image data GD transmitted from the image forming apparatus 10 (step S6).

When the operator makes operation input using the first operation screen GS displayed on the touch panel 75, the external terminal 50 transmits operation input information EM based on that operation input to the image forming apparatus 10 (step S7).

In response to this, the image forming apparatus 10 generates image data GD for a new operation screen (the next operation screen) GS to be displayed on the touch panel 75 of the external terminal 50 on the basis of the operation input information EM (step S8). The image forming apparatus 10 then transmits the generated image data GD to the external terminal 50. The external terminal 50 generates the operation screen GS and displays the generated screen on the touch panel 75 on the basis of the image data GD transmitted from the image forming apparatus 10 (step S9).

Thereafter, the processing from steps S7 to S9 is repeatedly executed. For example, in the case of a screen transition when "Box Function" is executed, a display screen as illustrated in FIG. 7 is displayed on the touch panel 25 at a certain time point TP. At the same time point TP, an operation screen GS1 as illustrated in FIG. 8 is displayed on the touch panel 75 on the basis of the image data GD (GD1) for the operation screen GS (GS1) from the image forming apparatus 10. As described above, FIG. 7 illustrates the operation unit 6 of the image forming apparatus 10, and FIG. 8 illustrates the operation unit 56 of the external terminal 50. The following description focuses on a case in which operation screens as illustrated in FIGS. 7 and 8 are displayed.

Figure 6:
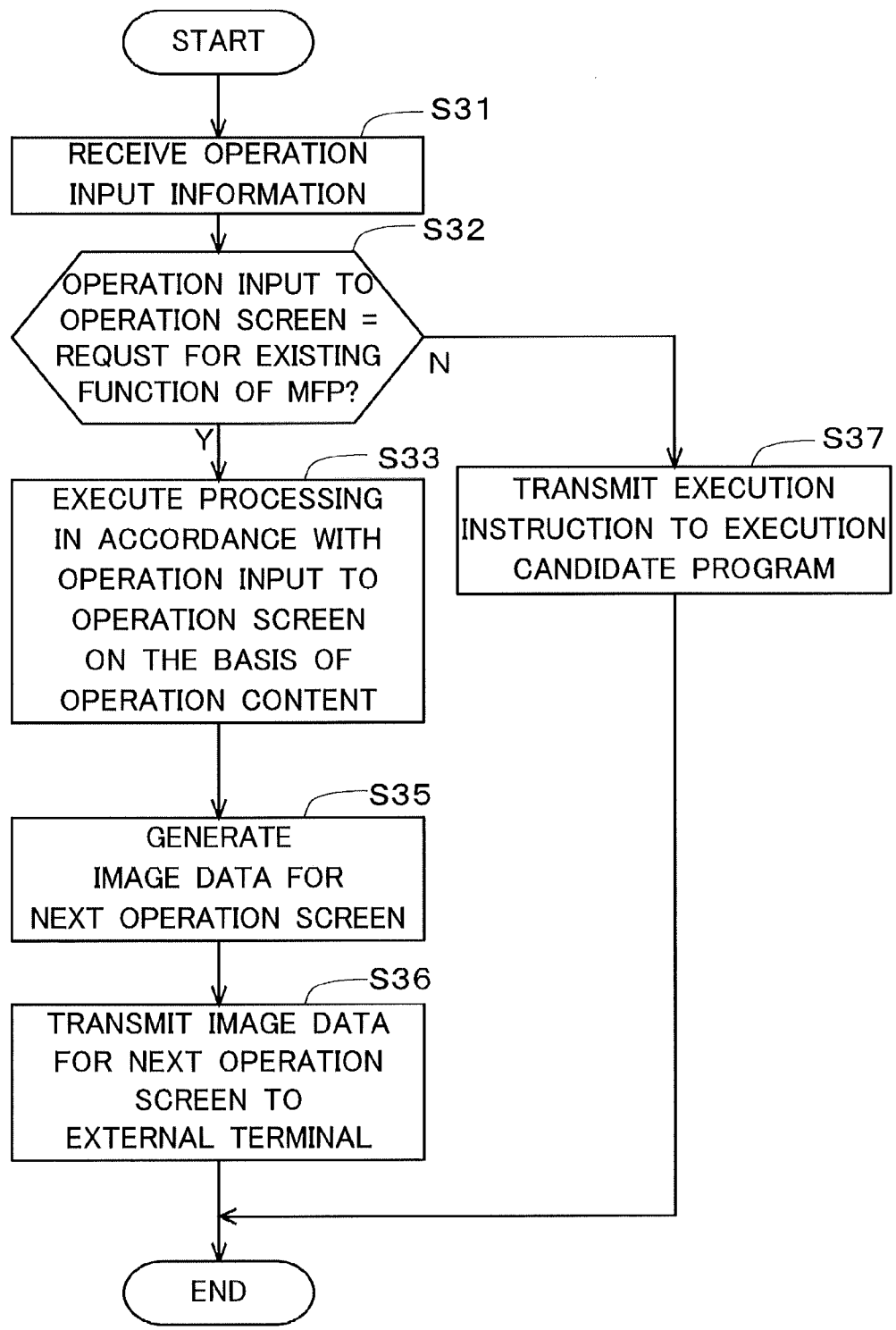
FIG. 6 is a flowchart of operations performed by the image forming apparatus.

FIG. 6 is a detailed flowchart of the operations performed by the image forming apparatus 10 in step S8 in FIG. 5. Hereinafter, the operations of the image forming apparatus 10 when operation input is made to the operation screen GS1 will be described with reference to the flowchart of FIG. 6.

As illustrated in FIG. 8, the operation screen GS1 includes a touch panel image GA and a hardware image GB. The touch panel image GA is an image (operation image) regarding the touch panel 25 of the image forming apparatus 10 and is similar to the image displayed on the touch panel 25.

Here, the touch panel image GA displays a selection screen SG for selecting the data files FL1 to FL8 stored in the image forming apparatus 10 (specifically, the shared box BX) (see FIG. 8). The selection screen SG displays icons CN1 to CN8 that correspond respectively to the data files FL1 to FL8, and the user can select the data files FL to FL8 through the icons CN1 to CN8 displayed on the selection screen SG.

When operation input is made to any of the icons CN1 to CN8 in a state in which this operation screen GS1 is displayed on the touch panel 75 (see FIG. 8), the external terminal 50 generates operation input information EM regarding the operation input. For example, when the icon CN1 is selected through the operation screen GS1, the external terminal 50 generates operation input information EM1 regarding the operation input to the icon CN1 and transmits the operation input information EM1 to the image forming apparatus 10.

The image forming apparatus 10 in turn receives the operation input information EM1 from the external terminal 50 (step S31 (FIG. 6)). The image forming apparatus 10 then determines whether or not operation input to the operation screen GS1 (specifically, the operation of selecting the icon CN1) is a request for an existing function of the image forming apparatus 10 on the basis of the operation input information EM1 (step S32). When it has been determined that the operation input to the operation screen GS1 is a request for an existing function of the image forming apparatus 10, the processing proceeds to step S33. On the other hand, when it has been determined that the operation input to the operation screen GS1 is not a request for an existing function of the image forming apparatus 10, the processing proceeds to step S37. Here, it is assumed that the operation of selecting the icon CN1 on the operation screen GS1 has been performed. This selection operation is a request for an existing function of the image forming apparatus 10 (specifically, a function other than the function of invoking an external terminal program PG), and therefore the processing proceeds to step S33.

The image forming apparatus 10 thereafter executes processing in accordance with the operation content on the operation screen GS1 and on the basis of the operation input information EM1 (step S33). Specifically, the image forming apparatus 10 specifies the data file FL1 corresponding to the icon CN1 as a selected data file HF in accordance with the operation of selecting the icon CN1 on the operation screen GS1.

Then, the image forming apparatus 10 generates new image data GD2 for a new operation screen (the next operation screen) GS2 to be displayed on the touch panel 75 of the external terminal 50 (step S35).

Specifically, the image forming apparatus 10 first determines an external terminal program that can handle the data file FL1, which is the selected data file HF, as an execution candidate program. More specifically, the image forming apparatus 10 specifies an external terminal program that can handle the data file FL1 in the PDF format by referencing the program information PJ1 (FIG. 4). Here, the image forming apparatus 10 determines the external terminal program PG21 as an execution candidate program because "PDF format" is associated with the "external terminal program (PDF editing program) PG21" on line 1 of the program information PJ1.

After this, the image forming apparatus 10 generates image data GD2 for a new operation screen GS2 (see FIG. 9) that includes a key image KG21 for receiving an instruction to execute the external terminal program PG21.

After the display data GD2 for the operation screen GS2 has been generated, the image forming apparatus 10 transmits the display data GD2 to the external terminal 50 (step S36).

In the aforementioned step S35, if no external terminal program that can handle the selected data file HF is present and therefore an execution candidate program cannot be specified, the image forming apparatus 10 generates image data GD for an operation screen GS that does not include the aforementioned key image KG21.

Figure 9:
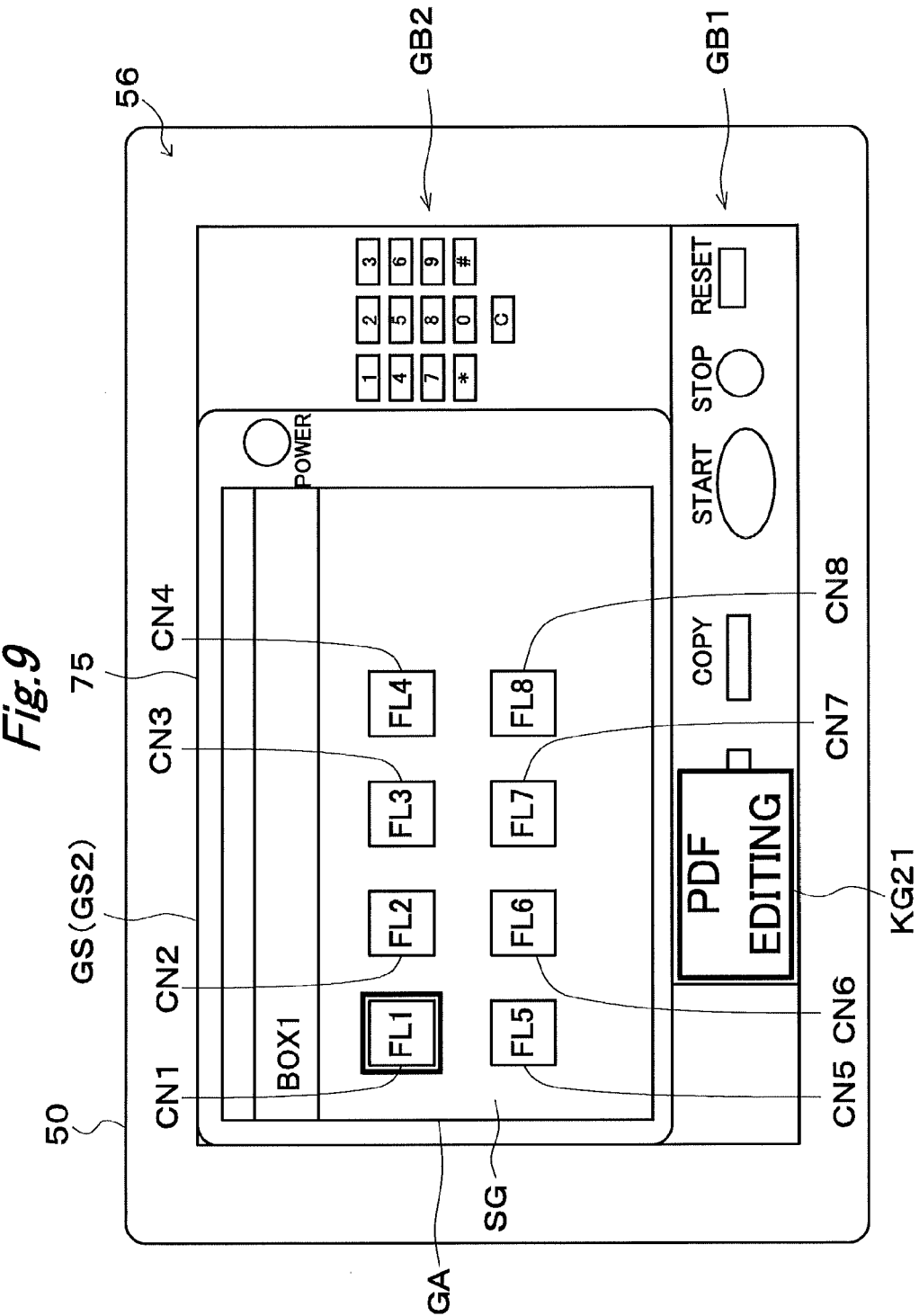
FIG. 9 illustrates an operation screen of the external terminal.

The external terminal 50 displays the operation screen GS2 on the touch panel 75 on the basis of the image data GD2 for the operation screen GS2 transmitted from the image forming apparatus 10 (see FIG. 9). As illustrated in FIG. 9, the operation screen GS2 displays the key image KG21 that is superimposed on the hardware image GB1 and includes a character string reading "PDF Editing." The operation screen GS2 also displays an image of a bold frame around the icon CN1 to indicate that the icon CN1 has been selected.

Here, when the operator makes operation input to the key image KG21 on the operation screen GS (specifically, operation input by pressing the image), the external terminal 50 generates new operation input information EM (EM2) based on the operation input and transmits the operation input information EM2 to the image forming apparatus 10.

In response to this, the image forming apparatus 10 again executes the processing illustrated in the flowchart of FIG. 6.

Specifically, the image forming apparatus 10 receives the operation input information EM2 from the external terminal 50 (step S31). The image forming apparatus 10 then determines whether or not the operation input to the operation screen GS2 is a request for an existing function of the image forming apparatus 10, on the basis of the operation input information EM2 (step S32). Here, it is assumed that the operation of pressing the key image KG21 is operation input for receiving an instruction to execute an external terminal program (specifically, the program PG21) (in other words, operation input asking for the function of invoking an external terminal program PG) and is not a request for an existing function of the image forming apparatus 10. Thus, the processing proceeds to step S37.

The image forming apparatus 10 then transmits an instruction to execute the external terminal program PG21 to the external terminal 50 (step S37). Simultaneously with this, the image forming apparatus 10 also transmits the selected data file HF (data file FL1) selected through the operation screen GS1 to the external terminal 50.

Figure 10:
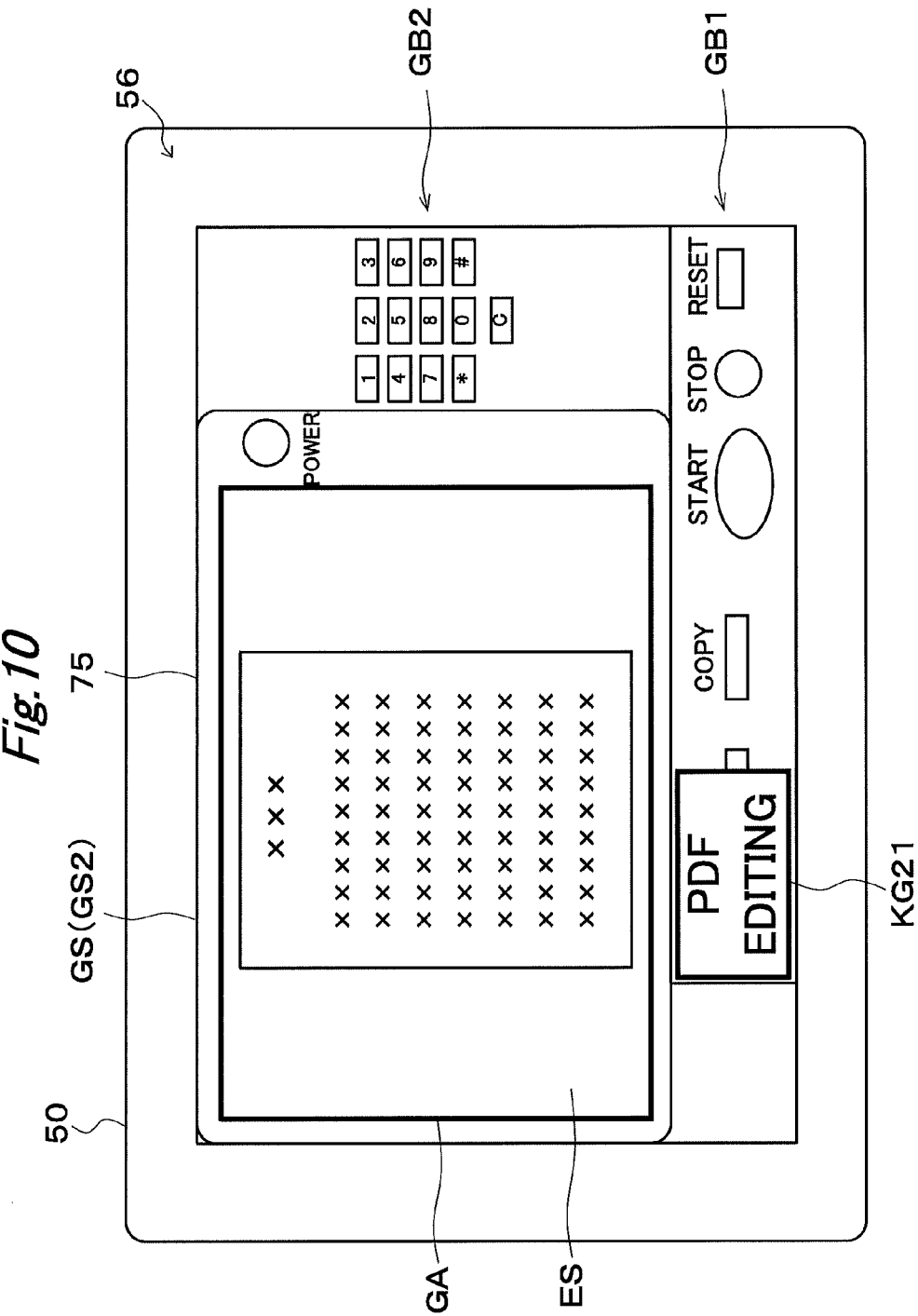
FIG. 10 illustrates an operation screen of the external terminal.

In response to this, the external terminal 50 executes the external terminal program PG21 and displays an editing screen ES for editing the data file FL1 such that the editing screen ES is superimposed on the touch panel image GA as illustrated in FIG. 10. The user of the external terminal 50 can thus edit the data file FL through the editing screen ES. When the editing of the data file FL1 is completed, the external terminal 50 transmits the edited data file FL1 (as a reply) to the image forming apparatus 10. The image forming apparatus 10 stores the edited data file FL1 transmitted back from the external terminal 50 into the storage unit 5.

According to the operations described above, the image data GD2 for the new operation screen GS2 that includes the key image KG21 for receiving an instruction to execute an execution candidate program (external terminal program PG21) is generated on the basis of the program information PJ1. The operation screen GS2 is then displayed on the touch panel 75 of the external terminal 50 on the basis of the image data GD2. It is thus possible to execute the external terminal program PG21 installed in the external terminal 50 through the operation screen GS2 that is for use in remote control of the image forming apparatus 10.

Also, the image forming apparatus 10 generates the image data GD2 for the operation screen GS2 that includes the key image KG21 on the basis of the program information PJ1 and transmits the image data GD2 to the external terminal 50. The operation screen GS2 including the key image KG21 is then displayed on the touch panel 75 on the basis of the image data GD2. It is thus possible to receive an instruction to execute the external terminal program PG21 through the operation screen GS2 (specifically, the key image KG21) that is based on the image data GD2 from the image forming apparatus 10. In other words, an instruction to execute the external terminal program PG21 can be received without using any program except the program PG2 for controlling a remote operation.

In addition, when the data file FL1 in the image forming apparatus 10 is selected as a selected data file HF through the icon CN1 on the operation screen GS1, the external terminal program PG21 that can handle the data file FL1 is selected as an execution candidate program. Then, the image data GD2 for the new operation screen GS2 that includes the key image KG21 for receiving an instruction to execute the external terminal program PG21 is generated. It is thus possible to selectively display, on the operation screen GS2, the key image KG21 for receiving an instruction to execute the external terminal program PG21 that can handle the data file FL1. The new operation screen GS2 therefore does not display key images for receiving instructions to execute the external terminal programs PG22 and PG23 that cannot handle the data file FL1. It is thus possible to prevent the display on the new operation screen GS2 from being complicated.

2. Second Embodiment

A second embodiment is a variation on the first embodiment.

The following description focuses on differences from the first embodiment.

The above first embodiment describes a case in which the data file FL1 in the "PDF format" is selected as a selected data file HF through the icon CN1 on the operation screen GS1 (FIG. 8).

The second embodiment describes a case in which the data file FL6 in the "JPEG format" is selected as a selected data file HF through the icon CN6 on the operation screen GS1 (FIG. 8).

Specifically, when the icon CN6 is selected in a state in which the operation screen GS1 is displayed on the touch panel 75 (see FIG. 8), the external terminal 50 generates operation input information EM3 regarding the operation input to the icon CN6 and transmits the operation input information EM3 to the image forming apparatus 10 (see step S7 in FIG. 5).

In response to this, the image forming apparatus 10 executes the above-described processing illustrated in the flowchart of FIG. 6.

To be specific, the image forming apparatus 10 receives the operation input information EM3 from the external terminal 50 (step S31). The image forming apparatus 10 then determines whether or not the operation input made on the operation screen GS1 is a request for an existing function of the image forming apparatus 10, on the basis of the operation input information EM3 (step S32). Here, it is assumed that the operation of selecting the icon CN6 on the operation screen GS1 is remote control of the image forming apparatus 10, and therefore the processing proceeds to step S33.

Thereafter, the image forming apparatus 10 specifies the data file FL6 that corresponds to the icon CN6 selected through the operation screen GS1 as a selected data file HF, on the basis of the operation input information EM3.

The image forming apparatus 10 then generates image data GD3 for a new operation screen (the next operation screen) GS3 to be displayed on the touch panel 75 of the external terminal 50 (step S35).

Specifically, the image forming apparatus 10 first determines an external terminal program that can handle the data file FL6, which is the selected data file HF, as an execution candidate program. To be more specific, the image forming apparatus 10 specifies an external terminal program that can handle the data file FL6 in the JPEG format by referencing the program information PJ1 (FIG. 4). In the present example, the image forming apparatus 10 determines the two external terminal programs PG22 and PG23 as execution candidate programs because the "JPEG format" is associated with the two "external terminal programs PG22 and PG23" on line 2 of the program information PJ1.

After this, the image forming apparatus 10 generates the data GD3 for display of the operation screen GS3 that includes key images KG22 and KG23 for receiving instructions to execute the external terminal programs PG22 and PG23.

After generating the data GD3 for display of the operation screen GS3, the image forming apparatus 10 transmits the data GD3 for display to the external terminal 50 (step S36).

Figure 11:
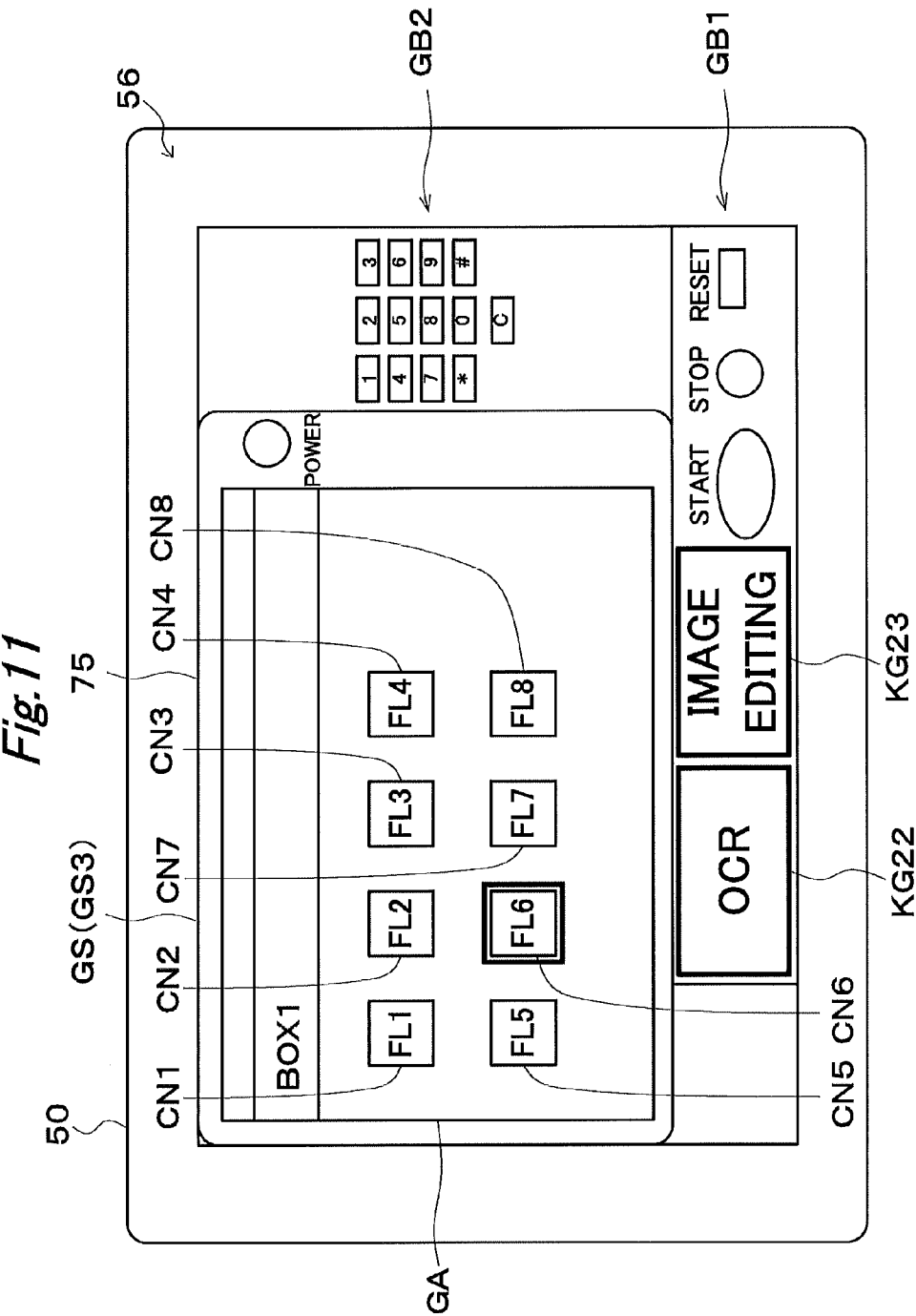
FIG. 11 illustrates an operation screen of an external terminal according to a second embodiment.

Meanwhile, the external terminal 50 displays the operation screen GS3 on the touch panel 75 on the basis of the image data GD3 for the operation screen GS3 transmitted from the image forming apparatus 10 (see FIG. 11). As illustrated in FIG. 11, the operation screen GS3 displays the key images KG22 and KG23 superimposed on the hardware image GB1, the key image KG22 including a character string that reads "OCR," the key image KG23 including a character string that reads "Image Editing." The operation screen GS3 also displays an image of a bold frame around the icon CN6 to indicate that the icon CN6 has been selected.

According to the operation described above, the image data GD3 for the new operation screen GS3 that includes the key images KG22 and KG23 for receiving instructions to execute execution candidate programs (external terminal programs PG22 and PG23) is generated on the basis of the program information PJ1. The operation screen GS3 is then displayed on the touch panel 75 of the external terminal 50 on the basis of the image data GD3. It is thus possible to execute the external terminal programs PG22 and PG23 installed in the external terminal 50 through the operation screen GS3 during remote control of the image forming apparatus 10 using the operation screen GS3 displayed on the touch panel 75 of the external terminal 50.

Also, the image forming apparatus 10 generates the image data GD3 for the operation screen GS3 including the key images KG22 and KG23 on the basis of the program information PJ1 and transmits the image data GD3 to the external terminal 50. The operation screen GS3 including the key images KG22 and KG23 is then displayed on the touch panel 75 on the basis of the image data GD3. It is thus possible to receive instructions to execute the external terminal programs PG22 and PG23 through the operation screen GS3 (specifically, the key images KG22 and KG23) that is based on the image data GD3 from the image forming apparatus 10. In other words, instructions to execute the external terminal programs PG22 and PG23 can be received without using any program except the program PG2 for controlling a remote operation.

In addition, when the specific data file FL6 in the image forming apparatus 10 is selected as a selected data file HF through the icon CN6 on the operation screen GS1, the external terminal programs PG22 and PG23 that can handle the data file FL6 are selected as execution candidate programs. Then, the image data GD3 for the new operation screen GS3 that includes the key images KG22 and KG23 for receiving instructions to execute the external terminal programs PG22 and PG23 is generated. It is thus possible to selectively display, on the operation screen GS3, the key images KG22 and KG22 for receiving instructions to execute the external terminal programs PG22 and PG23 that can handle the data file FL6. The new operation screen GS3 therefore does not display another key image for receiving an instruction to execute the external terminal program PG21 that cannot handle the data file FL6. It is thus possible to prevent the display on the new operation screen GS3 from being complicated.

3. Third Embodiment

A third embodiment is a variation on each of the above-described embodiments.

The following description focuses on differences from the above-described embodiments.

The above-described embodiments describe a case in which the image forming apparatus 10 is remotely controlled by executing the program PG2 in the external terminal 50.

The third embodiment describes a case in which the image forming apparatus 10 is remotely controlled using a web cooperative application software (simply, "web cooperative application"), which will be described below. The web cooperative application is an application that performs, for example, an operation of setting the image forming apparatus 10 from the outside (e.g., external terminal 50), using the web browser function. Here, it is assumed that PageScope Web Connection (PSWC) is installed as a web cooperative application in the image forming apparatus 10.

3-1. Configuration

Figure 12:
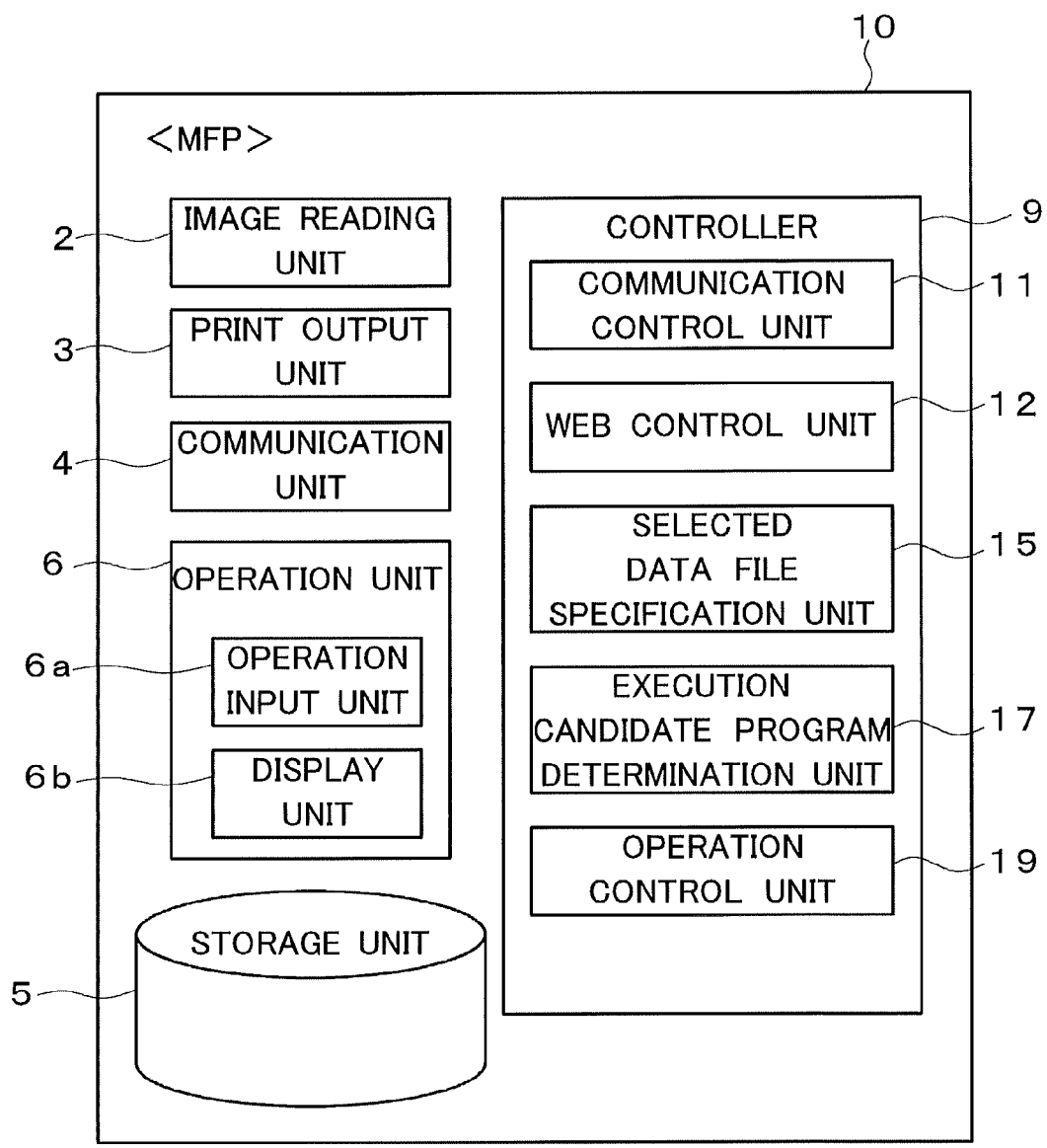
FIG. 12 is a functional block diagram of an image forming apparatus according to a third embodiment.

FIG. 12 is a functional block diagram of an MFP 10 according to the third embodiment.

As illustrated in FIG. 12, a controller 9 of the MFP 10 realizes various types of processing units including a communication control unit 11, a WEB control unit 12, a selected data file specification unit 15, an execution candidate program determination unit 17, and an operation control unit 19.

The WEB control unit 12 is a processing unit configured to convert an operation screen (operation page) for controlling the MFP 10 into a predetermined format (e.g., HTML format) and generate HTML data as data for displaying the operation screen (operation page). Specifically, the WEB control unit 12 generates HTML data in response to an HTTP request (simply "request") RQ (see FIG. 14) from an external terminal 50 and transmits the HTML data as an HTTP response (simply "response") RP to the external terminal 50. As described above, the WEB control unit 12 functions as an HTTP server that provides HTML data.

Note that the processing units 11, 15, 17, and 19 other than the WEB control unit 12 execute processing similar to that in the above-described embodiments.

Figure 14:
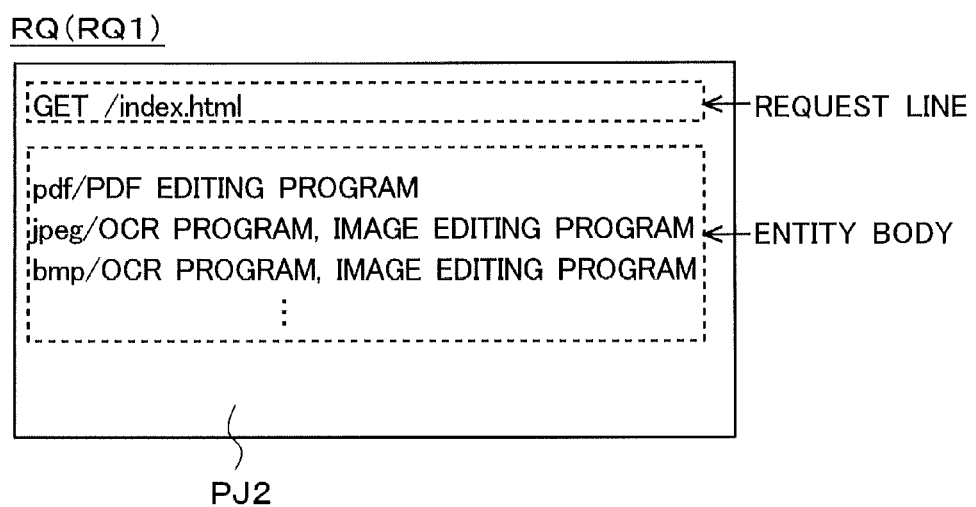
FIG. 14 illustrates an HTTP request.

FIG. 14 shows an example of an HTTP request RQ (RQ1). The request RQ is configured by, for example, "Request Line" and "Entity Box." "Request Line" describes, for example, a reply request to transmit HTML data for a specific page. "Entity box" describes, for example, program information regarding external terminal programs.

The external terminal 50 further has installed therein an external terminal program PG24 having an WEB browser function, in addition to the external terminal programs PG21, PG22, and PG23 described in the above embodiments.

3-2. Operation

Figure 13:
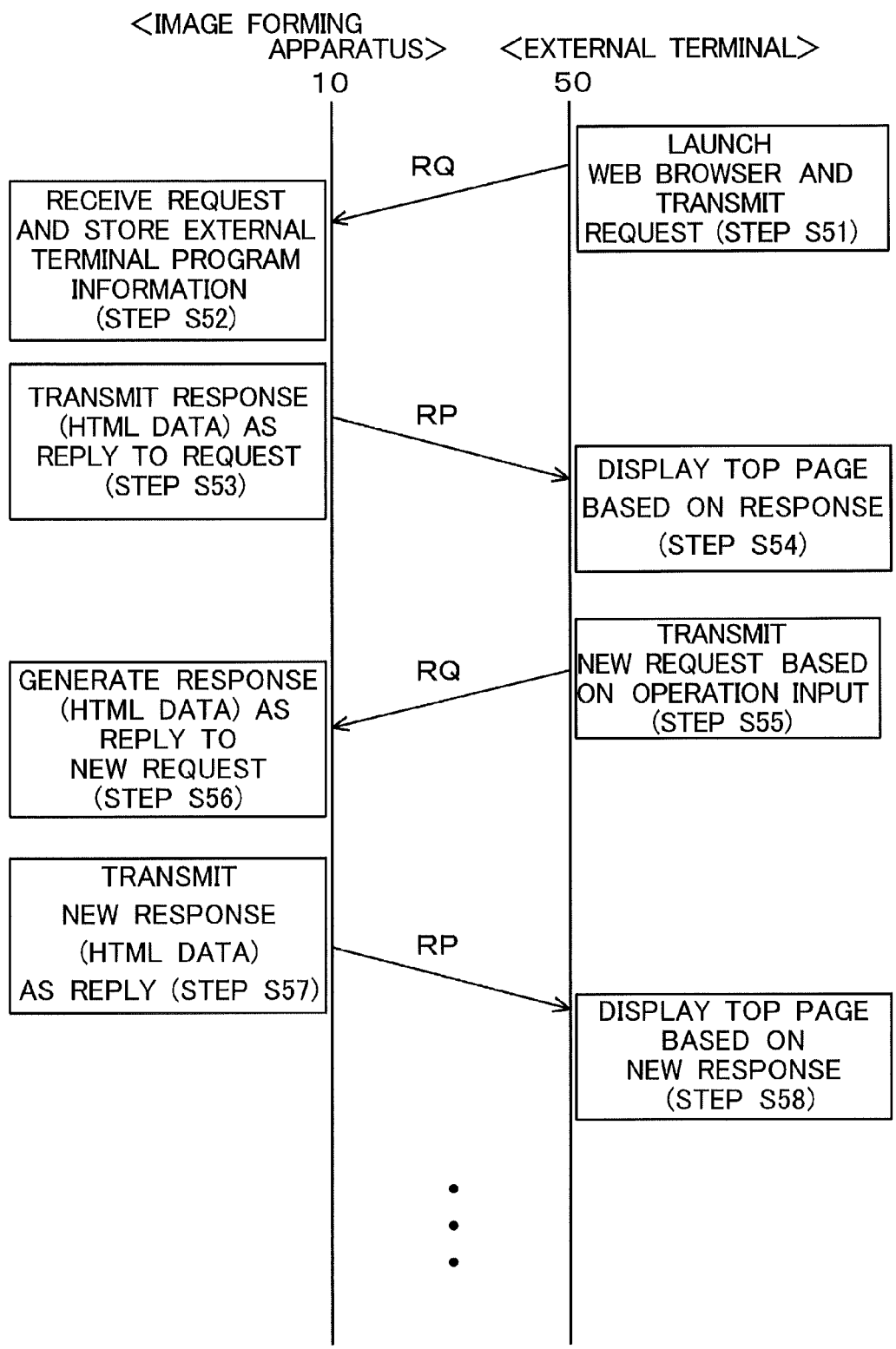
FIG. 13 is a flowchart of operations performed in the image forming system.

FIG. 13 illustrates operations performed in an image forming system 1 according to the third embodiment. Hereinbelow, the operations of the image forming system 1 will be described with reference to FIG. 13.

First, when the external terminal program PG24 is launched by the external terminal 50, a WEB browser screen is displayed on the touch panel 75 of the external terminal 50. Upon receiving input of, for example, an IP address of the image forming apparatus 10 (e.g., http://192.168.1.20/when the image forming apparatus 10 has an IP address of "192.168.1.20") into a URL field on the WEB browser screen, the external terminal 50 transmits a first request RQ1 (see FIG. 14) to the image forming apparatus 10 (step S51).

As illustrated in FIG. 14, "Request Line" of the request RQ1 stores a command to request the HTTP server to provide HTML data for an initial operation screen (hereinafter, "top page WP1") for use in remote control of the image forming apparatus 10.

"Entity body" of the request RQ1 stores information regarding the external terminal programs PG21, PG22, PG23, and so on (hereinafter, "program information PJ2"). To be specific, "Entity body" defines and stores the relationship between the external terminal programs and data files (specifically, formats of the data files) that can be executed by the external terminal programs.

Specifically, as illustrated in FIG. 14, on line 1 of "Entity Body," the "PDF format" and the external terminal program (PDF editing program) PG21 that can handle the "PDF format" are recorded in association with each other. To be more specific, "pdf/PDF editing program" is recorded on line 1 of "Entity Body." On line 2 of "Entity Body," the "Joint Photographic Experts Group (JPEG) format" and the external terminal programs (OCR program and image editing program) PG22 and PG23 that can handle the "JPEG format" are recorded in association with each other. On line 3 of "Entity Body," the "BMP format" and the external terminal programs (OCR program and image editing program) PG22 and PG23 that can handle the "BMP format" are recorded in association with each other. In this way, "Entity Body" of the request RQ1 stores the program information PJ2 that has the content similar to that of the program information PJ1 (see FIG. 4) described in the above embodiments.

Upon receiving such a request RQ1 from the external terminal 50, the image forming apparatus 10 analyzes the content of the request RQ1 and stores the program information PJ2 recorded in "Entity body" of the request RQ1 into the storage unit 5 (step S52).

Figure 15:
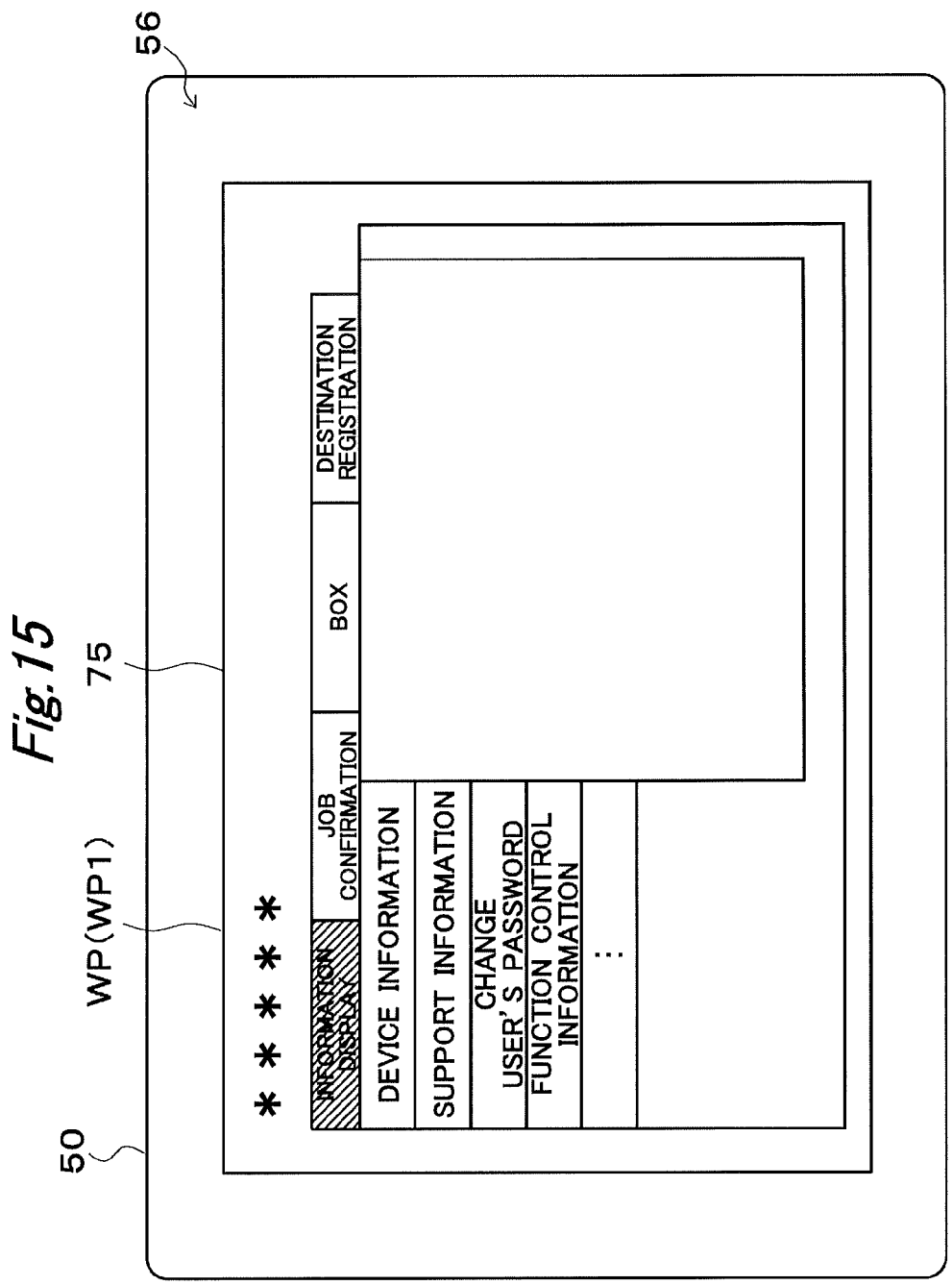
FIG. 15 illustrates an operation screen of the external terminal.

The image forming apparatus 10 then transmits a response RP1 as a reply to the external terminal 50 in response to the content of the request RQ1 (specifically, a request for HTML data for the top page WP1) (step S53). To be specific, the image forming apparatus 10 generates HTML data for the top page WP1 (see FIG. 15) and transmits the generated HTML data as a response P1 to the external terminal 50.

The external terminal 50 receives the response RP1 (HTML data for the top page WP1) from the image forming apparatus 10 and displays the top page WP1 (see FIG. 15) on the touch panel 75 on the basis of the response RP1 (step S54). The top page WP1 is configured as a page that contains a plurality of tags corresponding to a plurality of items ("information display," "job confirmation," "box," and "destination registration"). On the top page WP1, the "information display" tab is selected by default and a screen that displays content regarding the "information display" tab is displayed. Specifically, the top page WP1 displays a screen that includes a menu regarding the item "Information Display" (e.g., "device information" and "support information").

Upon receiving thereafter operation input through the top page WP1 (see FIG. 15) displayed on the touch panel 75, the external terminal 50 transmits another piece of operation input information (specifically, a new request RQ2) regarding the operation input to the image forming apparatus 10 (step S55). For example, upon receiving operation input that selects the "Box" tab on the top page WP1, the external terminal 50 transmits a new request RQ2 (request for HTML data for a low-order page WP2 that includes a content of the "Box" tab) to the image forming apparatus 10.

Figure 16:
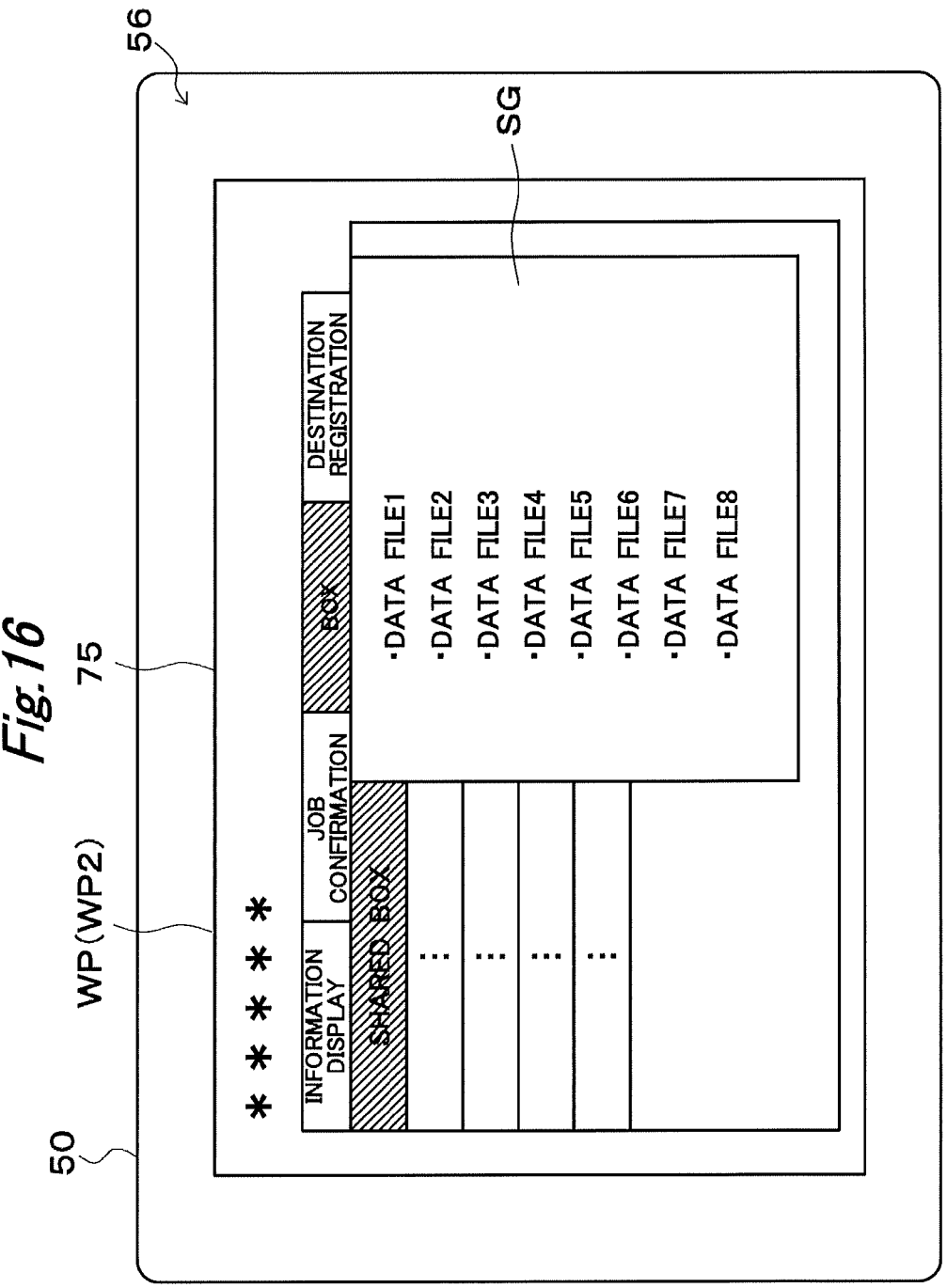
FIG. 16 illustrates an operation screen of the external terminal.

Upon receiving the request RQ2 from the external terminal 50, the image forming apparatus 10 analyzes the content of the request RQ2 and generates the low-order page WP2 on the basis of the request RQ2 (step S56). In the present example, the image forming apparatus 10 generates the low-order page WP2 that includes a selection screen SG for selecting data files FL1 to FL8 in a shared box BX, as illustrated in FIG. 16. The image forming apparatus 10 then transmits a response RP2 (specifically, HTML data for the low-order page WP2) as a reply to the external terminal 50 in accordance with the content of the request RQ2 (step S57).

As illustrated in FIG. 16, the external terminal 50 displays the low-order page WP2 on the touch panel 75 on the basis of the response RP2 (HTML data for the low-order page WP2) from the image forming apparatus 10 (step S58). The "data files 1 to 8" on the low-order page WP2 correspond respectively to the data files FL1 to FL8 in the shared box BX. The user can select the data files FL1 to FL8 through "data file 1" to "data file 8" on the low-order page WP2.

Upon receiving thereafter operation input through the low-order page WP2 displayed on the touch panel 75, the external terminal 50 again executes the processing of steps S55 to S58 in FIG. 13.

For example, upon receiving operation input to "Data File 1" on the selection screen SG, the external terminal 50 transmits a request RQ3 for HTML data for a low-order page WP3 to the image forming apparatus 10 (step S55).

Upon receiving the request RQ3 from the external terminal 50, the image forming apparatus 10 analyzes the content of the request RQ3 and generates the low-order page WP3 on the basis of the request RQ3 (step S56).

Specifically, the image forming apparatus 10 first specifies the data file FL1 corresponding to "Data File 1" selected through the low-order page WP2 as a selected data file HF on the basis of the request RQ3.

Next, the image forming apparatus 10 determines an external terminal program that can handle the selected data file (i.e., data file FL1) as an execution candidate program by referencing the program information PJ2. To be specific, the image forming apparatus 10 specifies an external terminal program that can handle the data file F11 in the PDF format by referencing the program information PJ2. In the present example, the image forming apparatus 10 determines the external terminal program PG21 as an execution candidate program because "PDF format" is associated with the "external terminal program PG21."

The image forming apparatus 10 then generates HTML data for the low-order page WP3 that includes a key image KG31 for receiving an instruction to execute the external terminal program PG21.

Thereafter, the image forming apparatus 10 transmits a response RP3 (specifically, HTML data for the low-order page WP3) as a reply to the external terminal 50 in accordance with the content of the request RQ3 (step S57).

The external terminal 50 displays the low-order page WP3 on the touch panel 75 on the basis of the response RP3 from the image forming apparatus 10 (step S58). On the low-order page WP3, as illustrated in FIG. 17, the key image KG31 including a character string that reads "PDF Editing" is set in the margin. Also, a character string that reads "Data File 1 (FL1)" corresponding to the data file FL1, which is the selected data file, is displayed with an underline in a bold italicized font on the low-order page WP3.

According to the operations described above, the HTML data for the new low-order page WP3 that includes the key image KG31 for receiving an instruction to execute the execution candidate program (external terminal program PG21) is generated on the basis of the program information PJ2. The low-order page WP3 is then displayed on the touch panel 75 of the external terminal 50 on the basis of the HTML data. It is thus possible to execute the external terminal program PG21 installed in the external terminal 50 through the low-order page WP3 for use in remote control of the image forming apparatus 10.

Also, the image forming apparatus 10 generates the HTML data for the low-order page WP3 including the key image KG31 on the basis of the program information PJ2 and transmits the HTML data to the external terminal 50. The low-order page WP3 including the key image KG31 is then displayed on the touch panel 75 on the basis of the HTML data. It is thus possible to receive an instruction to execute the external terminal program PG21 through the low-order page WP3 (specifically, the key image KG31) that is based on the HTML data from the image forming apparatus 10. In other words, an instruction to execute the external terminal program PG21 can be received without using any program except the program PG2 for controlling a remote operation.

When the data file FL1 in the image forming apparatus 10 is selected as a selected data file HF through the character string "Data File 1" on the low-order page WP2 (FIG. 16), the external terminal program PG21 that can handle the data file FL1 is selected as an execution candidate program. Then, HTML data for the new low-order page WP3 that includes the key image KG31 for receiving an instruction to execute the external terminal program PG21 is generated. It is thus possible to selectively display the key image KG31 for receiving an instruction to execute the external terminal program PG21 that can handle the data file FL1. The new low-order page WP3 therefore does not display key images for receiving instructions to execute the external terminal programs PG22 and PG23 that cannot handle the data file FL1. It is thus possible to prevent the display on the new low-order page WP3 from being complicated.

4. Variations

While the above has been a description of embodiments of the present invention, the present invention is not intended to be limited to the details described above.

For example, although the second embodiment describes a case in which the data file FL6 in the "JPEG format" is selected through the icon CN6 on the operation screen GS1, the present invention is not limited to this. Alternatively, the data file FL8 in the "BMP format" may be selected through the icon CN8 on the operation screen GS1. Also, in this case, processing similar to that of the above-described second embodiment is executed, and an operation screen GS (not shown) that includes a key image KG22 for receiving an instruction to execute the external terminal program (OCR program) PG22 and a key image KG23 for receiving an instruction to execute the external terminal program (image editing program) PG23 can be displayed on the touch panel 75 of the external terminal 50.

The above first embodiment describes a case of generating the image data GD2 for the operation screen GS2 (see FIG. 9) that selectively includes the key image KG21 for receiving an instruction to execute the external terminal program PG21 that can handle the data file FL1, which is the selected data file HF. The present invention is, however, not limited to this.

For example, image data GD for an operation screen GS (not shown) that includes all key images KG for receiving instructions to execute external terminal programs that can handle the data files FL1 to FL8 corresponding to the icons CN1 to CN8 (see FIG. 8) being displayed on the selection screen SG of the operation screen GS1 may be generated regardless of which data file FL has been selected.

Specifically, image data GD for an operation screen (not shown) that includes key images KG41, KG42, and KG43, which will be described below, may be generated. The key image KG41 is an image of a key for receiving an instruction to execute the external terminal program PG21 that can handle the data files FL1 to FL4. The key image KG42 is an image of a key for receiving an instruction to execute the external terminal program PG22 that can handle the data files FL5 to FL8. The key image KG43 is an image of a key for receiving an instruction to execute the external terminal program PG23 that can handle the data files FL5 to FL8.

Alternatively, image data for an operation screen GS that includes all key images KG for receiving instructions to execute external terminal programs that can handle data files FL stored in the image forming apparatus 10 may be generated regardless of the operation content or display state of the operation screen GS.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming system comprising:
    an image forming apparatus; and
    an external terminal communicable with the image forming apparatus and configured to execute a plurality of programs installed therein,
    the image forming apparatus including a first controller configured to:
        generate first display data for a first operation screen including a key image for receiving an instruction from a user to execute an external terminal program, on the basis of program information regarding the external terminal program; and
        transmit the first display data to the external terminal, and
    the external terminal including a second controller configured to:
        receive the first display data transmitted from the image forming apparatus; and
        display the first operation screen on a display unit of the external terminal on the basis of the first display data.

2. The image forming system according to claim 1, wherein
    the program information includes information that defines a relationship between the external terminal program and a data file that is able to be processed by the external terminal program, and
    the first controller is configured to, on the basis of the program information, determine the external terminal program that is able to execute processing on a data file stored in the image forming apparatus as an execution candidate program and generate the first display data for the first operation screen that includes the key image for receiving the instruction to execute the execution candidate program.

3. The image forming system according to claim 2, wherein the first controller of the image forming apparatus is further configured to:
    receive operation input information regarding operation input to a second operation screen that is displayed on the display unit of the external terminal and that includes a selection screen for selecting a data file stored in the image forming apparatus; and
    specify a selected data file that is a data file selected through the selection screen, on the basis of the operation input information,
    wherein the first controller is configured to, on the basis of the program information, determine the external terminal program that is able to execute processing on the selected data file as the execution candidate program and generate the first display data for the first operation screen that includes the key image for receiving the instruction to execute the execution candidate program.

4. The image forming system according to claim 1, wherein the first controller is configured to receive the program information from the external terminal.

5. The image forming system according to claim 1, further comprising:
    an operation unit which includes hardware keys and/or a touch panel,
    wherein the first controller is configured to generate first display data for the first operation screen including the key image and an output unit image.

6. The image forming system according to claim 1, wherein the first controller is configured to generate first display data for the first operation screen on the basis of the program information in a type of file format that the external terminal program can process.

7. An image forming apparatus comprising:
    a first controller configured to:
    generate first display data for a first operation screen including a key image for receiving an instruction from a user to execute an external terminal program, on the basis of program information regarding the external terminal program; and
    transmit the first display data to an external terminal.

8. The image forming apparatus according to claim 7, wherein
    the program information includes information that defines a relationship between the external terminal program and a data file that is able to be processed by the external terminal program, and
    the first controller is configured to, on the basis of the program information, determine the external terminal program that is able to execute processing on a data file stored in the image forming apparatus as the execution candidate program and generate the first display data for the first operation screen that includes the key image for receiving the instruction to execute the execution candidate program.

9. The image forming apparatus according to claim 8, the first controller is further configured to:
    receive operation input information regarding operation input to a second operation screen that is displayed on the display unit of the external terminal and that includes a selection screen for selecting a data file stored in the image forming apparatus; and
    specify a selected data file that is a data file selected through the selection screen, on the basis of the operation input information,
    wherein the first controller is configured to, on the basis of the program information, determine the external terminal program that is able to execute processing on the selected data file as the execution candidate program and generate the first display data for the first operation screen that includes the key image for receiving the instruction to execute the execution candidate program.

10. The image forming apparatus according to claim 7, wherein
 the first controller is configured to receive the program information from the external terminal.

11. The image forming apparatus according to claim 7, further comprising:
 an operation unit which includes hardware keys and/or a touch panel,
 wherein the first controller is configured to generate first display data for the first operation screen including the key image and an output unit image.

12. The image forming apparatus according to claim 7, wherein
 the first controller is configured to generate first display data for the first operation screen on the basis of the program information in a type of file format that the external terminal program can process.

13. A non-transitory computer-readable recording medium having recorded thereon a program for causing a computer built into an image forming apparatus to execute the steps of:
 a) generating first display data for a first operation screen on the basis of program information regarding a type of an external terminal program that is a program installed in an external terminal communicable with the image forming apparatus, the first operation screen including a key image for receiving an instruction to execute the external terminal program; and
 b) transmitting the first display data to the external terminal to cause the first operation screen to be displayed on a display unit of the external terminal.

* * * * *